3,006,817
PURIFICATION OF PYRROLIDONE FOR THE POLYMERIZATION TO POLYPYRROLIDONE

William O. Ney, Jr., Lincoln Township, Washington County, Minn., assignor to Minnesota Mining and Manufacturing Company, St. Paul, Minn., a corporation of Delaware
No Drawing. Filed Jan. 27, 1958, Ser. No. 711,116
3 Claims. (Cl. 202—42)

This invention relates to a process for the purification of lactams and more particularly to the purification of 2-pyrrolidone.

It is known that the polymerization of 2-pyrrolidone is sensitive to the presence of traces of impurities and procedures have been described for removal of certain impurities from pyrrolidone in U.S. Patent 2,806,850 and U.S. Patent 2,802,777. Even when these processes are employed it is found that 2-pyrrolidone may not polymerize reproducibly using the best methods and techniques known to the art. It has been found that this difficulty is brought about in large measure to the presence of amounts of water which are not removed by the heretofore known methods. In particular it is found that as little as 0.15 percent by weight of water has an inhibiting effect on polymerization as well as a deleterious effect on the polypyrrolidone formed. This difficulty appears to be caused by the strong tendency of pyrrolidone to form a very stable hydrate which does not dissociate extensively even in solution in pyrrolidone and to the chain terminating action of water. Azeotropic distillation with benzene or toluene at atmospheric pressure as suggested in U.S. Patent 2,802,777 fails to remove all the water. Distillation of a forerun of pyrrolidone containing water as in U.S. Patent 2,638,463 likewise fails in the complete removal of water, presumably because of the difficulty of fractionating a mixture of pyrrolidone and its hydrate. This process suffers also from the disadvantage of converting a portion of the monomer into a wet form, the distillate, which still ultimately requires drying if it is to have any value in the production of polypyrrolidone. Furthermore, in the processes heretofore employed, the distillation even using solvents which boil at temperatures reasonably near to the boiling point of water involves distillation temperatures eventually reaching a point upwards of 100° C., which apparently leads to the formation of small amounts of dehydration products of pyrrolidone, which are also deleterious.

The problem of providing anhydrous 2-pyrrolidone monomer and mixtures thereof, for example, with ε-caprolactam is therefore one which has not been solved in spite of previous attempts.

In another aspect, the same difficulty is experienced in the preparation of anhydrous solutions, in pyrrolidone, of alkali metal salts of pyrrolidone which are particularly useful as catalysts for the polymerization of pyrrolidone. In this instance the presence of an excess of water tends to result in saponification of the pyrrolidone.

It is an object of this invention to provide a method for the preparation of anhydrous 2-pyrrolidone. A further object is to provide a process for rendering mixtures comprising 2-pyrrolidone anhydrous. A still further object of the invention is to provide a simple process for preparing anhydrous solutions of alkali metal salts of 2-pyrrolidone in the monomer. Other objects will become apparent from the disclosure made hereinafter.

In accordance with the above and other objects of this invention, it has been found that hydrous 2-pyrrolidone is rendered quite anhydrous by distillation of xylene therefrom under reduced pressure. This is quite surprising since U.S. Patent 2,802,777 states that azeotropic removal of water from pyrrolidone should be carried out using solvents boiling near the boiling point of water, such as benzene, and that higher boiling solvents are less satisfactory. Xylene boils at about 137–140° C., far above that of any solvents which would be expected to be useful. It may be assumed that the effectiveness of this treatment is due to codistillation of water with the xylene.

When present in amounts of up to about 50 mole percent, water is apparently present in 2-pyrrolidone as the hydrate which appears to be stable at temperatures up to about 90° to 100° C. There is, of course, some vapor pressure of water over this hydrate, but it appears to be very low, that is the hydrate is very little dissociated. It is surprising to find that a mixture of water-contaminated 2-pyrrolidone, that is pyrrolidone containing the hydrate, can be freed of water by distillation with xylene under reduced pressure, at temperatures far below the decomposition temperature of the hydrate, at which temperatures the vapor pressure of water is extremely low. The dissociation of the hydrate with substantially complete removal of water under these conditions is entirely unexpected. The procedure of this invention is conveniently effected by distilling pyrrolidone with an excess of xylene under reduced pressure until the xylene is removed. Pyrrolidone prepared by this method is found to contain less than 0.1 percent water by weight when analyzed by the Karl-Fischer method. Traces of xylene which may remain are not objectionable since they are inert. The 2-pyrrolidone may then be distilled under reduced pressure as is conventional, although if the pyrrolidone was pure except for the presence of water, it can be used directly. Likewise, when anhydrous solutions of an alkali metal salt of pyrrolidone in pyrrolidone itself are prepared, these are used directly.

The 2-pyrrolidone prepared by the process of the invention is readily and reproducibly polymerizable, for example, in heptane suspension in the presence of potassium pyrrolidone as a catalyst, with acetyl-pyrrolidone as an initiator.

It is a further advantage of the process of the invention that it is applicable with equal effectiveness even to pyrrolidone containing rather substantial amounts of water, for example, a solution of aqueous potassium hydroxide in pyrrolidone which is to be converted to an anhydrous solution of the potassium salt for use as a catalyst in the polymerization reaction to furnish polypyrrolidone. In the preparation of such solutions it is found, surprisingly, that there is substantially no tendency for the saponification of the pyrrolidone by the alkali even in the presence of water. In such a process it is not necessary to distill the pyrrolidone, but the anhydrous solution produced by codistillation of xylene and water is used directly. The process is also applicable to pyrrolidone in admixture with another copolymerizable monomer, such as ε-caprolactam, for the production of copolymers as described in my copending application S.N. 708,981 filed January 15, 1958, now abandoned.

Broadly speaking, about 20 to 500 parts of xylene are added to 100 parts of pyrrolidone and distillation is conducted at a temperature in the range of about 30° C. to 60° C., which requires that the pressure be reduced to about 10 to 30 mm. of mercury, the water being thereby codistilled with the xylene. The xylene which is used can be o-, m- or p-xylene or a mixture of one or more xylene isomers as commercially available. The proportion of xylene used will of course depend to an extent upon the amount of water present in or added to the monomer, as illustrated more specifically hereinafter. The amount of xylene added need not be greater than that required to remove the water present in the pyrrolidone or mixture containing pyrrolidone but use of excess amounts over this requirement obviously occasions no disadvantage other than that of the necessity for removing the excess by distillation.

2-pyrrolidone which has been rendered anhydrous by the process of the invention is a stable, colorless liquid crystallizing to a solid which melts at about 24° C. which can be stored indefinitely and, if moisture has been excluded, can be polymerized reproducibly at any time. An anhydrous solution of an alkali metal salt of pyrrolidone in pyrrolidone thus prepared tends to polymerize very slowly, but may be stored for moderate lengths of time, especially at low temperatures, if moisture is excluded.

Having thus generally described the invention the following examples will be more specifically illustrative. All parts are by weight, unless otherwise specified. Inherent viscosities are determined on 0.2 percent solutions in metacresol by the conventional procedure.

*Example 1*

An anhydrous solution of the potassium derivative of pyrrolidone in the monomer which is suitable for use in polymerization procedures, is prepared by treating a xylene solution of the monomer with aqueous potassium hydroxide, followed by distillation under reduced pressure, as follows: A solution of 100 parts of redistilled pyrrolidone (containing about 0.5 percent of water) in 215 parts of xylene (Merck Reagent grade, boiling about 137° to 140° C. and free from peroxides) is heated under reduced pressure (about 18 mm. Hg) until codistillation of xylene and water commences at about 45° C. pot temperature (vapor temperature about 30° C. to 40° C.). A solution of 2.2 parts of 85 percent potassium hydroxide in 3.0 parts of water is then added dropwise and distillation is continued to remove water and xylene. After water is no longer visible in the distillate, xylene is further removed by distilling until the contents of the vessel reach a temperature of about 90° C. (vapor temperature up to about 60° C.), at which point all of the water and substantially all of the xylene is in the distillate. The pot residue is an anhydrous, 2.8 mole percent potassium pyrrolidone solution in pyrrolidone, which on cooling to about 25° C. or lower can be stored in the absence of moisture and used for subsequent polymerizations. It becomes cloudy on standing but does not polymerize appreciably during at least about one week at room temperature.

Similarly, a 2.8 mole percent, anhydrous potassium caprolactam solution in caprolactam is prepared by the same procedure using 1.7 parts of potassium hydroxide in 3 parts of water with 100 parts of ε-caprolactam. This anhydrous solution is stable in the absence of moisture on standing at temperatures at which it is a viscous liquid and below about 70° C. for at least a week. At room temperature the material solidifies and then is stable indefinitely in the absence of moisture.

Polymers are readily and reproducibly produced from the solutions prepared above, as follows: 0.07 part of N-acetyl-pyrrolidone are added to 10.0 parts of the solution of potassium pyrrolidone or to a total of 10.0 parts of a desired mixture of these solutions of potassium derivatives, followed by heating at about 70° C. for 48 hours. The use of mixtures of pyrrolidone and caprolactam solutions produces copolymers. In each case a solid block of polymer is obtained which is first cut into small pieces and then further comminuted in aqueous suspension in a Waring blendor. The finely divided polymer is collected and reslurried at about 20–25° C. for 1 hour periods, first in 0.5 percent acetic acid and then twice in water, and is finally dried under vacuum at about 70° C. for about 24 hours. The results are shown in the following table:

| Parts potassium pyrrolidone solution | 10 | 9.5 | 7.6 | 5.1 | 2.6 |
|---|---|---|---|---|---|
| Parts potassium caprolactam solution | | 0.5 | 2.4 | 4.9 | 7.4 |
| Inherent viscosity of polymer | 1.8 | 2.2 | 2.4 | 1.9 | 1.6 |

These polymers are obtained as fine, white, thermoplastic powders having melting points about 250° C. They can be extruded under pressure at about the melting point whereupon they form thin flexible films or filaments.

Alternatively, similar polymers are formed when anhydrous pyrrolidone is prepared by codistillation of xylene and water therefrom under reduced pressure using 50 parts of xylene for each 100 parts of pyrrolidone, according to the procedure set forth above. The anhydrous monomer is combined in suitable proportions with a 12 mole percent solution of the potassium salt of pyrrolidone in pyrrolidone prepared by the above described procedure using 9 parts of 85 percent potassium hydroxide in 12 parts of water with 100 parts of pyrrolidone and 250 parts of xylene, and distilling the mixture under reduced pressure to remove the water and xylene therefrom. When 2.5 parts of the anhydrous 12 mole percent potassium pyrrolidone solution, 7.5 parts of anhydrous pyrrolidone and 0.07 part of acetyl pyrrolidone are combined, polymerization proceeds readily and is substantially complete in 36 hours at about 25° C. The polymer is isolated and purified as above and resembles the above homopolymer in all respects. Copolymers are formed in the same manner by replacing desired amounts of anhydrous pyrrolidone by anhydrous caprolactam.

For comparison, when a potassium pyrrolidone solution is prepared by dissolving 9.0 g. of potassium hydroxide in 130 parts of pyrrolidone and water is removed by distilling out 30 parts of pyrrolidone at 90° to 120° C. and this solution is used in the above procedure to polymerize pyrrolidone dried by distillation of a 10 percent forerun according to the procedure of U.S. Patent 2,638,463, it is found that yields of polymer varying from about 10 to 30 percent and having inherent viscosities varying between about 0.6 to 1.2 are obtained.

What is claimed is:

1. The process for rendering 2-pyrrolidone containing minor amounts of water anhydrous for the formation of polypyrrolidone which comprises the steps of adding xylene to a mixture containing the 2-pyrrolidone and distilling at least a part of the xylene therefrom at a temperature in the range of about 30° C. to about 60° C., and at a pressure in the range of about 10 to 30 mm. of mercury.

2. The process for rendering 2-pyrrolidone containing minor amounts of water anhydrous for the formation of polypyrrolidone, which comprises the steps of mixing 100 parts of the 2-pyrrolidone with from about 20 to 500 parts by weight of xylene and codistilling water and xylene therefrom at a temperature in the range of about 30° C. to about 60° C., and at a pressure in the range of about 10 to 30 mm. of mercury.

3. The process for removing free and hydrate water from 2-pyrrolidone containing minor amounts of water, thereby to render the said 2-pyrrolidone suitable for formation of polypyrrolidone, which comprises mixing hydrous 2-pyrrolidone with xylene and codistilling a mixture of water and xylene therefrom at a temperature in the range of about 30° C. to about 60° C. and at a pressure in the range of about 10 to 30 mm. of mercury.

References Cited in the file of this patent

UNITED STATES PATENTS

| 2,708,653 | Sisco et al. | May 17, 1955 |
| 2,752,336 | Boon et al. | June 26, 1956 |
| 2,773,099 | Stork | Dec. 4, 1956 |
| 2,802,777 | Lohr | Aug. 13, 1957 |

OTHER REFERENCES

Horsley: "Azeotropic Data," 1952, pages 9–11.